(12) United States Patent
Lee et al.

(10) Patent No.: US 12,510,450 B2
(45) Date of Patent: Dec. 30, 2025

(54) APPARATUS AND METHOD FOR EVALUATING DURABILITY OF BATTERY MODULE FRAME FOR VEHICLE

(71) Applicant: LG ENERGY SOLUTION, LTD., Seoul (KR)

(72) Inventors: Su Hang Lee, Daejeon (KR); Yong Il Kim, Daejeon (KR); Jae Yeong Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 610 days.

(21) Appl. No.: 17/915,588

(22) PCT Filed: Sep. 13, 2021

(86) PCT No.: PCT/KR2021/012417
§ 371 (c)(1),
(2) Date: Sep. 29, 2022

(87) PCT Pub. No.: WO2022/060033
PCT Pub. Date: Mar. 24, 2022

(65) Prior Publication Data
US 2023/0129302 A1    Apr. 27, 2023

(30) Foreign Application Priority Data

Sep. 18, 2020 (KR) .................. 10-2020-0120332

(51) Int. Cl.
*G01N 3/12* (2006.01)
*G01B 11/16* (2006.01)
(Continued)

(52) U.S. Cl.
CPC .............. *G01N 3/12* (2013.01); *G01B 11/16* (2013.01); *G01L 1/22* (2013.01); *G01M 5/005* (2013.01); *H01M 10/4285* (2013.01)

(58) Field of Classification Search
CPC . G01B 11/16; G01L 1/20; G01L 1/22; G01M 5/0033; G01M 5/005; G01M 99/007; H01M 10/4285; H01M 2200/20
See application file for complete search history.

(56) References Cited

U.S. PATENT DOCUMENTS

2012/0227467 A1   9/2012  Baek et al.
2014/0223729 A1   8/2014  Chang et al.
(Continued)

FOREIGN PATENT DOCUMENTS

CN    201653812 U    11/2010
CN    210465171 U     5/2020
(Continued)

OTHER PUBLICATIONS

Office action dated Oct. 2, 2023, issued in corresponding JP Patent Application No. 2022-558529 (computer translation included).
(Continued)

*Primary Examiner* — Minh N Trinh
(74) *Attorney, Agent, or Firm* — Morgan, Lewis & Bockius LLP

(57) ABSTRACT

The present disclosure relates to an apparatus and method for evaluating durability of a battery module frame for a vehicle. According to the present disclosure, it is possible to easily evaluate the durability or a similar quality of the welded portion of the battery module frame by providing constraints similar to a situation in which a swelling phenomenon occurs in a battery cell in the battery module frame.

14 Claims, 8 Drawing Sheets

(51) Int. Cl.
  *G01L 1/22* (2006.01)
  *G01M 5/00* (2006.01)
  *H01M 10/42* (2006.01)

(56) References Cited

U.S. PATENT DOCUMENTS

| | | |
|---|---|---|
| 2017/0018820 A1 | 1/2017 | Fukuda et al. |
| 2018/0226698 A1 | 8/2018 | Lin et al. |
| 2021/0041334 A1 | 2/2021 | Adler et al. |
| 2023/0129302 A1* | 4/2023 | Lee .................... G01M 5/0033 73/862.627 |

FOREIGN PATENT DOCUMENTS

| | | | |
|---|---|---|---|
| DE | 10 2019 105 064 A1 | 9/2020 | |
| EP | 3 521 800 A1 | 8/2019 | |
| JP | 2013-114987 A | 6/2013 | |
| JP | 2015-133180 A | 7/2015 | |
| JP | 2015-161514 A | 9/2015 | |
| JP | 5800906 B2 | 10/2015 | |
| JP | 6169994 B2 | 7/2017 | |
| JP | 2018-116914 A | 7/2018 | |
| KR | 10-2007-0066489 A | 6/2007 | |
| KR | 10-2010-0020070 A | 2/2010 | |
| KR | 10-0997713 B1 | 12/2010 | |
| KR | 10-2011-0048090 A | 5/2011 | |
| KR | 10-2011-0125453 A | 11/2011 | |
| KR | 20160069188 A | 6/2016 | |
| KR | 10-2016-0087582 A | 7/2016 | |
| KR | 10-2018-0090722 A | 8/2018 | |

OTHER PUBLICATIONS

Extended European Search Report dated Oct. 20, 2023, issued in corresponding European Patent Application No. 21869655.7.
International Search Report (with partial translation) and Written Opinion dated Dec. 8, 2021 issued in corresponding International Patent Application No. PCT/KR2021/012417.
Office Action dated May 21, 2025, issued in corresponding Korean Patent Application No. 10-2020-0120332.
Office Action dated Apr. 16, 2025 for the corresponding Chinese Patent Application No. 202180024362.2.

* cited by examiner

[FIG. 1]
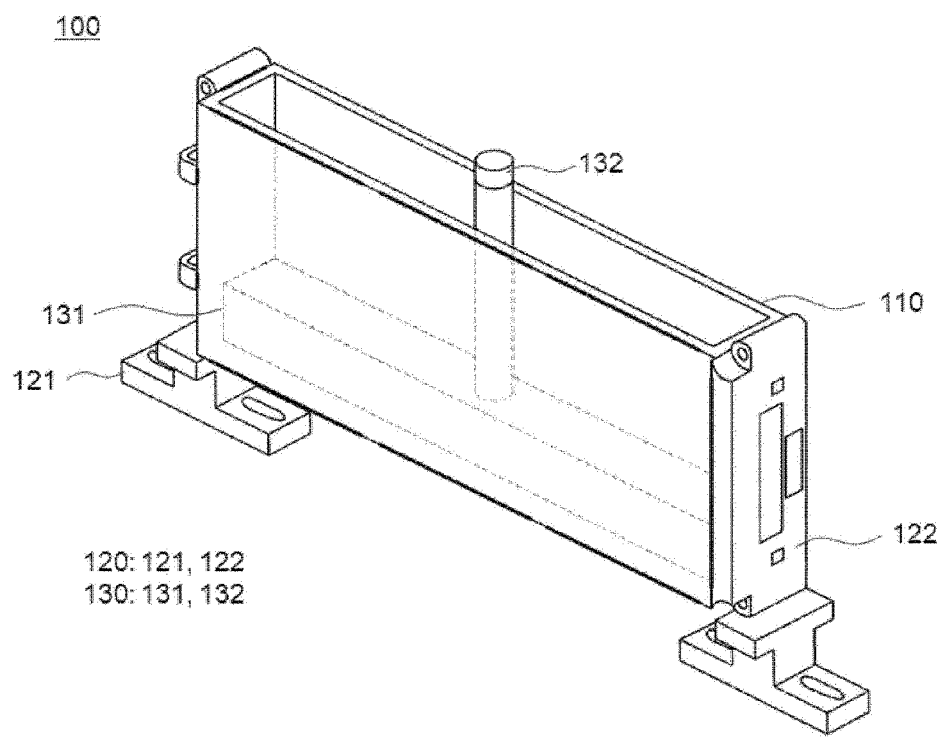

[FIG. 2]
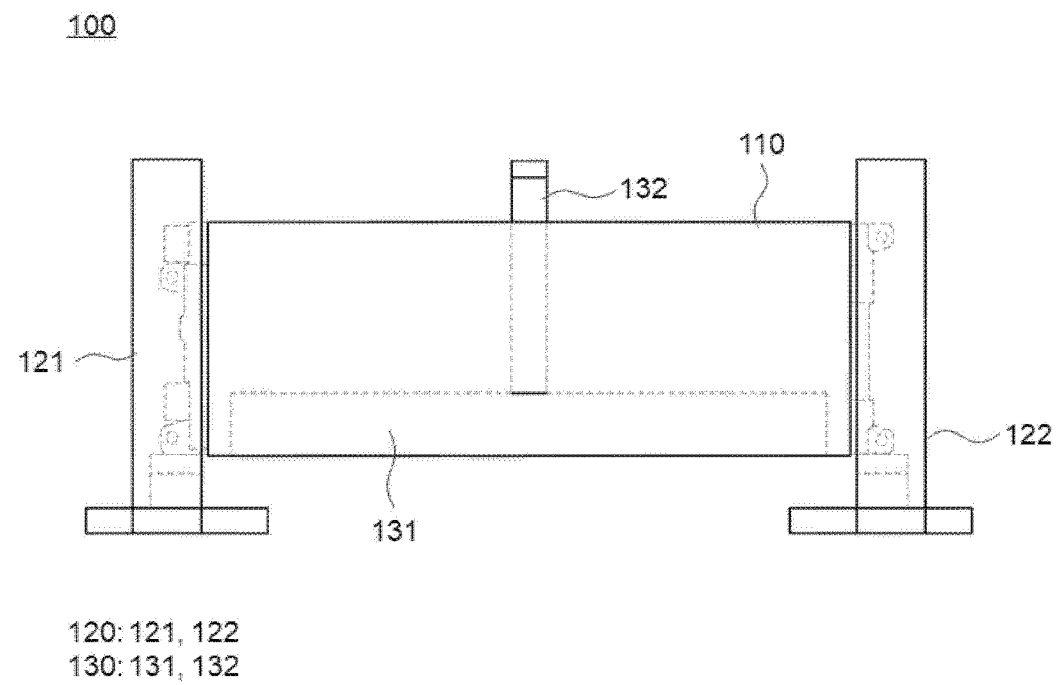
120: 121, 122
130: 131, 132

[FIG. 3]
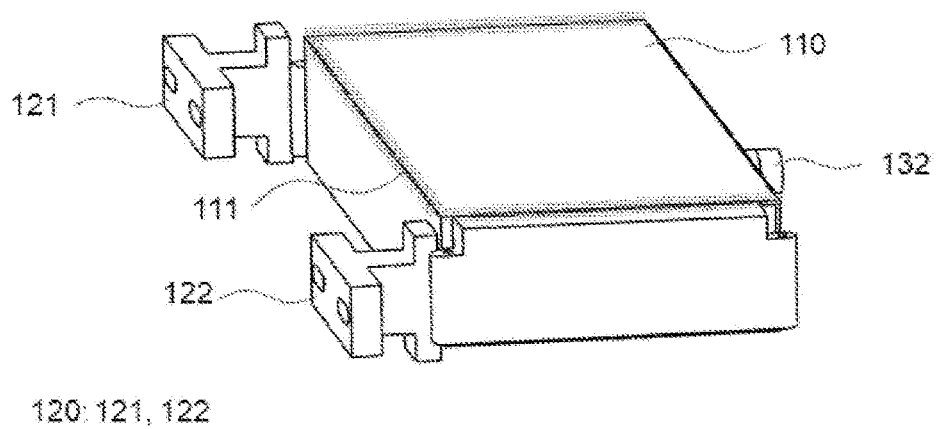

[FIG. 4]
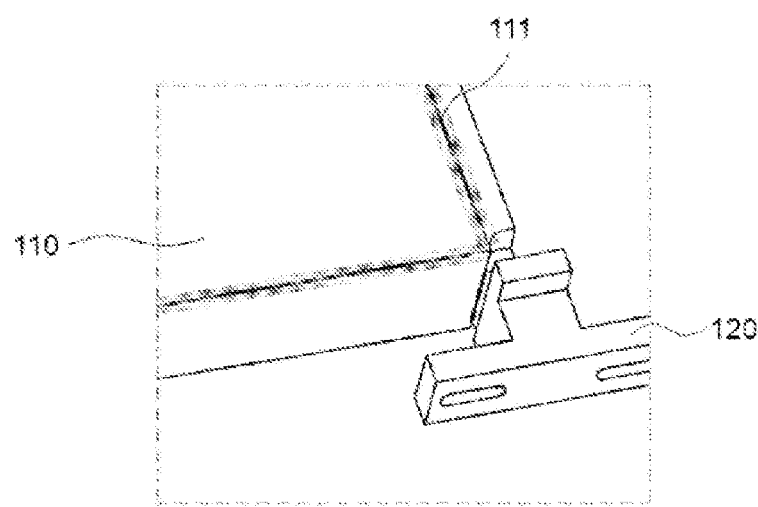

[FIG. 5]
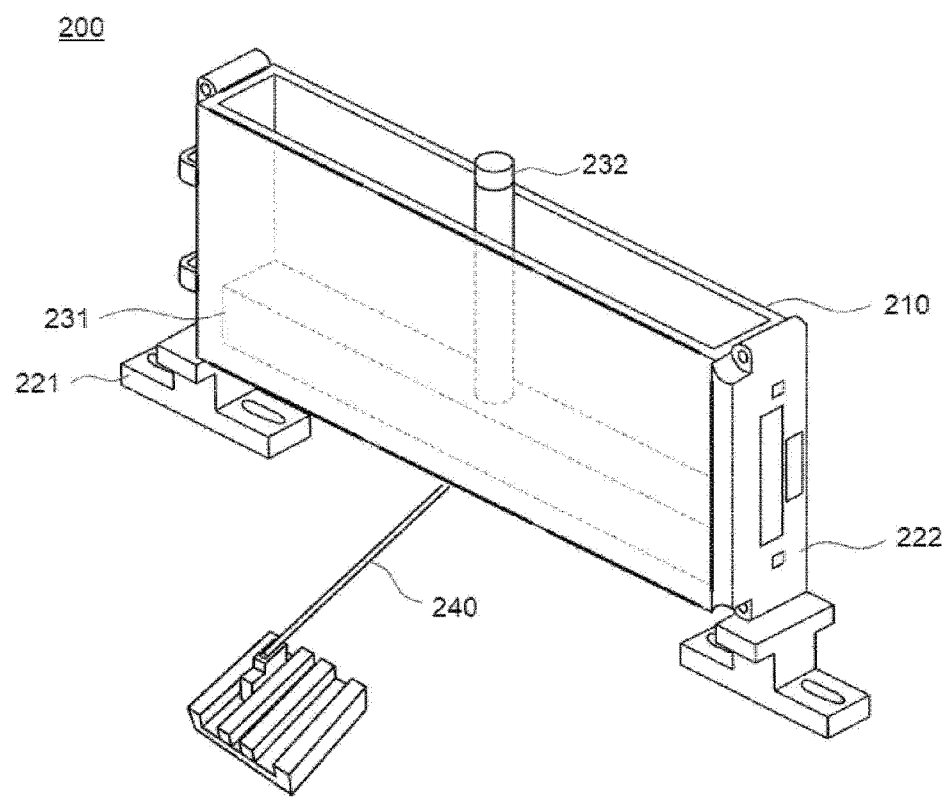
220: 221, 222
230: 231, 232

[FIG. 6]
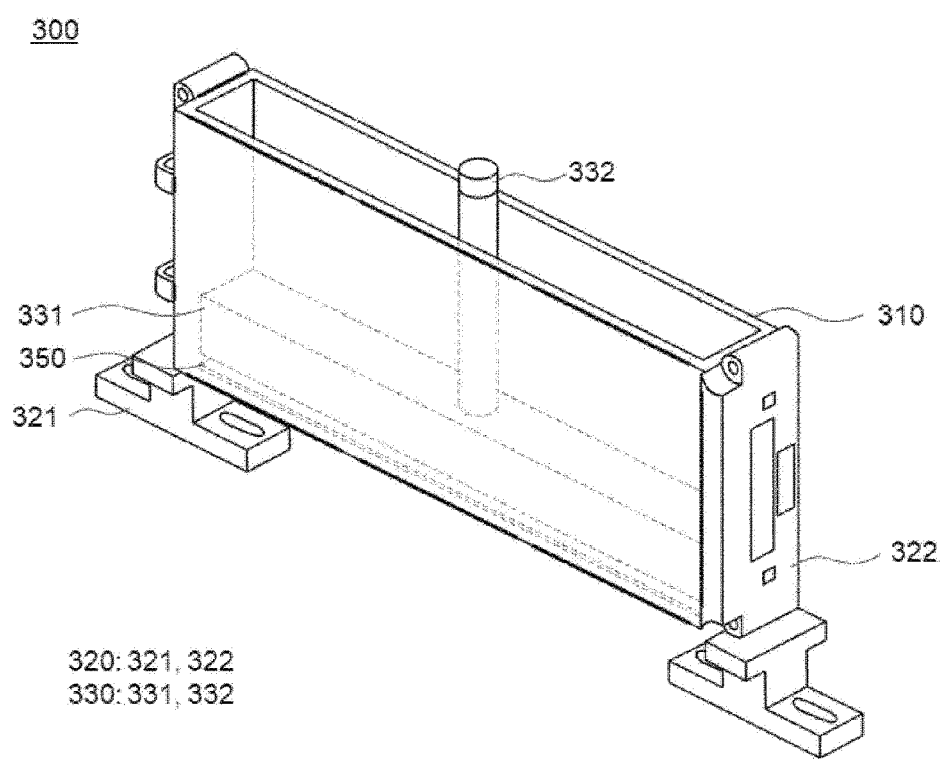

[FIG. 7]
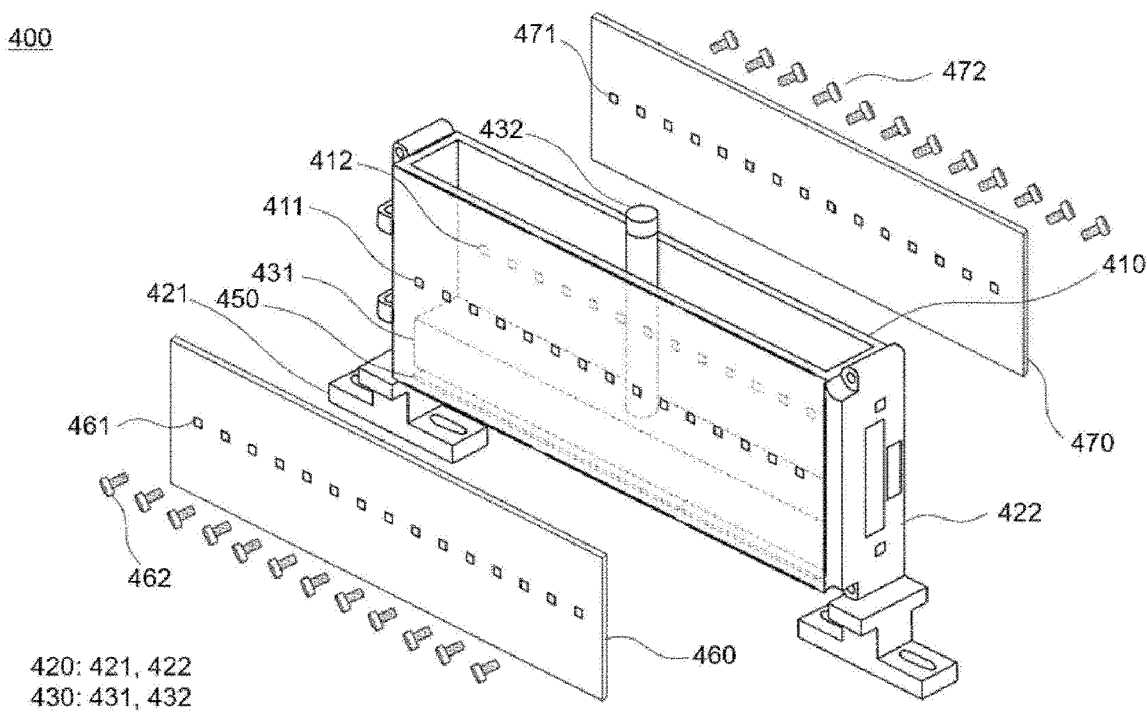

【FIG. 8】
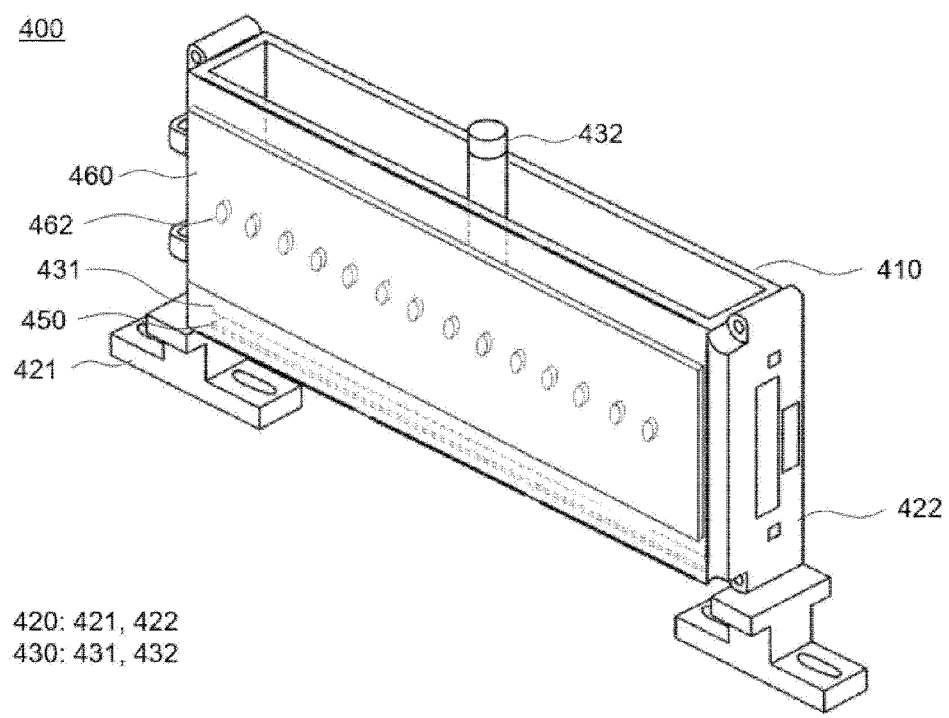
420: 421, 422
430: 431, 432

APPARATUS AND METHOD FOR EVALUATING DURABILITY OF BATTERY MODULE FRAME FOR VEHICLE

TECHNICAL FIELD

This application claims the benefit of priority based on Korean Patent Application No. 10-2020-0120332, filed on Sep. 18, 2020, and the entire contents of the Korean patent application are incorporated herein by reference.

The present invention relates to an apparatus and method for evaluating durability of a battery module frame for a vehicle.

BACKGROUND ART

Generally, the battery module is formed of a structure in which a plurality of battery cells are assembled through serial and/or parallel connection. The battery module may be composed of a battery cell laminate generated by lamination of a plurality of battery cells in one direction, a battery module frame for covering the battery cell laminate, and a sensing assembly for sensing electric characteristics of the battery cells.

The battery module frame may be classified into a multiple frame, which is manufactured by assembling a plurality of plates in a snap-fit-fastening or bolt-fastening scheme, and an integrally manufactured mono frame.

Further, in the initial stage of the design of the battery module, the structural stability assessment of the battery module frame is required.

For example, in the conventional battery module frame design process, it took a long time in analyzing the initial outer frame structure and reviewing it. In particular, it took a long time in evaluating the swelling force of a battery cell and durability of a battery module frame by repeated charge and discharge. Further, it was difficult to secure fatigue property data for the welded portion of the battery module frame when the battery cell swelled.

Therefore, there is a need for an apparatus and method for evaluating durability of a welded portion of a battery module frame.

DISCLOSURE

Technical Problem

The present invention is believed to solve at least some of the above problems. For example, an aspect of the present invention provides an apparatus and method for evaluating durability of a battery module frame for a vehicle, in which the durability of the welded portion of the battery module frame can be evaluated.

Technical Solution

The present invention provides an apparatus for evaluating durability of a battery module frame for a vehicle. In one embodiment, an apparatus for evaluating durability of a battery module frame for a vehicle according to the present invention includes: a support which supports a target battery module frame to allow the target battery module frame to be spaced apart from the ground at a predetermined interval; and a pressing unit which is arranged inside the battery module frame and applies pressure to a bottom side of the battery module frame. At this time, the pressing unit includes: a pressing member which is arranged on the bottom side of the battery module frame; and a pressing cylinder which is installed on an upper portion of the pressing member and presses the pressing member in a downward direction to allow pressure to be applied to the bottom side of the battery module frame.

In another embodiment, the apparatus for evaluating durability of a battery module frame according to the present invention further includes a displacement sensor which measures a displacement degree of the bottom side of the battery module frame.

In one embodiment, the support includes first and second supports respectively coupled to both sides of the battery module frame. Specifically, the first and second supports may be respectively bolt-fastened to both sides of the battery module frame.

In one embodiment, a size of the pressing member corresponds to a size of the battery cell.

In another example, a pressure sensor is arranged between the bottom side of the battery module frame and the pressing member.

In one embodiment, the pressing cylinder may be a pneumatic or hydraulic cylinder including a cylinder tube and a piston rod which vertically reciprocates in the cylinder tube. In a specific example, an end of the piston rod is positioned at the upper portion of the pressing member, and the pressing cylinder may lower the piston rod to press the pressing member in a downward direction.

In one embodiment, the apparatus for evaluating durability of a battery module frame according to the present invention may further include first and second reinforcing plates respectively coupled to a front surface and a rear surface of the battery module frame.

In a specific example, one or more bolt-fastening holes are formed on the front surface and the rear surface of the battery module frame, and one or more bolt-fastening holes are formed at one or more positions respectively on the first and second reinforcing plates, which correspond to the one or more bolt-fastening holes formed on the front surface and the rear surface of the battery module frame. Further, the battery module frame is bolt-fastened to the first and second reinforcing plates, respectively.

Further, the present invention provides a method of evaluating durability of a battery module frame using the above-described apparatus for evaluating durability of a battery module frame. In one embodiment, the method includes applying pressure to a bottom side of a battery module frame using a pressing unit which is arranged inside the battery module frame. At this time, during the applying of the pressure to the bottom side of the battery module frame, a displacement degree of a welded portion of the battery module frame is evaluated.

In another example, during the applying of the pressure to the bottom side of the battery module frame, a displacement degree of the bottom side of the battery module frame is measured. Further, during the applying of the pressure to the bottom side of the battery module frame, pressure may be applied to be oriented in a direction in which a swelling phenomenon occurs in the battery cell arranged in the battery module frame.

Advantageous Effects

According to an apparatus and method for evaluating durability of a battery module frame for a vehicle of the present invention, it is possible to easily evaluate the durability of the welded portion of the battery module frame, etc.

by providing constraints similar to a situation in which a swelling phenomenon occurs in a battery cell in the battery module frame.

BRIEF DESCRIPTION OF THE DRAWINGS

FIGS. 1 and 2 are schematic diagrams of an apparatus for evaluating durability of a battery module frame according to one embodiment of the present invention.

FIGS. 3 and 4 are schematic diagrams showing a welded portion of a target battery module frame according to one embodiment of the present invention.

FIG. 5 is a schematic diagram of an apparatus for evaluating durability of a battery module frame according to another embodiment of the present invention.

FIG. 6 is a schematic diagram of an apparatus for evaluating durability of a battery module frame according to yet another embodiment of the present invention.

FIGS. 7 and 8 are schematic diagrams of an apparatus for evaluating durability of a battery module frame according to yet another embodiment of the present invention.

DETAILED DESCRIPTION OF PREFERRED EMBODIMENTS

As the inventive concept allows for various changes and numerous embodiments, particular embodiments will be illustrated in the drawings and described in detail in the text. However, this is not intended to limit the present invention to the specific form disclosed, and it should be understood to include all changes, equivalents, and substitutes included in the spirit and scope of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

Hereinafter, the present invention will be described in detail.

The present invention relates to an apparatus and method for evaluating durability of a battery module frame for a vehicle.

as described above, in the initial stage of the design of the battery module, the structural stability assessment of the battery module frame is required. However, conventionally it took a long time in evaluating the swelling force of a battery cell and durability of a battery module frame by repeated charge and discharge. Further, it was difficult to secure fatigue property data for the welded portion of the battery module frame when the battery cell swelled.

As such, the inventors of the present invention invented an apparatus and method for evaluating durability of a battery module frame for a vehicle, in which the durability of the welded portion of the battery module frame can be evaluated. Specifically, the present invention provides an apparatus and method for evaluating durability of a battery module frame for a vehicle, in which the durability of the welded portion of the battery module frame can be easily evaluated, by providing constraints similar to a situation in which a swelling phenomenon occurs in a battery cell in the battery module frame.

Hereinafter, an apparatus and method for evaluating durability of a battery module frame for a vehicle will be described in detail.

In one embodiment, an apparatus for evaluating durability of a battery module frame for a vehicle according to the present invention includes: a support which supports a target battery module frame to allow the target battery module frame to be spaced apart from the ground at a predetermined interval; and a pressing unit which is arranged inside the battery module frame and applies pressure to a bottom side of the battery module frame.

The apparatus for evaluating durability of a battery module frame according to the present invention may provide constraints similar to a situation in which a swelling phenomenon occurs in a battery cell in the battery module frame by applying pressure to the target battery module frame. Further, when applying pressure to the battery module frame, it is possible to evaluate the durability of the welded portion of the battery module frame. Generally, the battery module frame is formed of a U frame or a mono frame having a structure in which a rectangular column type hollow is formed, and an end plate is weld-bonded to the end of each frame. In the present invention, pressure is applied in the same direction as the direction in which a swelling phenomenon occurs in a battery cell in a battery module frame. At this time, it is possible to evaluate the displacement degree in the welded portion of the battery module frame. Further, in the present invention, applying pressure in a downward direction may mean applying pressure in an end plate direction in a target battery module frame.

In one embodiment, the apparatus for evaluating durability of a battery module frame according to the present invention includes a support. The support is used to allow the target battery module frame to be spaced apart from the ground at a predetermined interval and is used to provide constraints similar to a situation in which a swelling phenomenon occurs in a battery cell at the time of evaluating durability of the battery module frame. In a specific example, the support includes first and second supports, and the first and second supports may be bolt-fastened to both sides of the battery module frame, respectively. Referring to the drawings of the present specification, the first and second supports are fastened to both sides of the battery module frame, but they may be fastened to the front surface and the rear surface of the battery module frame, respectively.

In another embodiment, the apparatus for evaluating durability of a battery module frame according to the present invention includes a pressing unit which applies pressure to the bottom side of the battery module frame. Specifically, the pressing unit may include a pressing member, which is arranged on the bottom side of the battery module frame, and a pressing cylinder, which is installed on the upper portion of the pressing member and presses the pressing member in a downward direction.

The pressing member is arranged on the bottom side of the inside of the battery module frame and corresponds to the battery cell arranged inside the battery module frame in the size and shape. Further, since the pressing member receives pressure from the pressing cylinder and transmits the pressure to the bottom side of the battery module frame, the pressing member may be formed of a rigid member.

The pressing cylinder is used to press the pressing member in a downward direction and allows pressure to be applied to the bottom side of the battery module frame. specifically, the pressing cylinder may be a general hydraulic cylinder or pneumatic cylinder. For example, the pressing cylinder may be a hydraulic cylinder. In a specific example, the pressing cylinder includes a cylinder tube and a piston rod which vertically reciprocates in the cylinder tube. At this time, the end of the piston rod is positioned at the upper portion of the pressing member. Further, the pressing cylinder may lower the piston rod to press the pressing member in a downward direction. The pressing cylinder may supply the fluid to the cylinder tube to lower the piston rod. On the other hand, the fluid supplied to the inside of the tube may be supplied by a fluid source such as a fluid pump or a hydraulic pump.

In one embodiment, in the apparatus for evaluating durability of a battery module frame according to the present invention, the pressing cylinder applies pressure to be oriented in a direction in which a swelling phenomenon occurs in the battery cell. Namely, an object of the present invention is to provide constraints similar to a situation in which a swelling phenomenon occurs in the battery cell by allowing pressure, which is applied to the target battery module frame, to be oriented in a direction in which the swelling phenomenon occurs in the battery cell by using a pressing unit.

In another embodiment, the apparatus for evaluating durability of a battery module frame according to the present invention further includes a displacement sensor. The displacement sensor is used to measure the displacement degree of the bottom side in the battery module frame. The displacement sensor is a non-contact sensor and may be an infrared sensor for irradiating and receiving infrared rays on the bottom side of the battery module frame to be measured. Further, the infrared sensor is located on the lower portion on the bottom side of the battery module frame, and it is possible to measure the displacement degree of the bottom side of the battery module frame by measuring the changed distance between the infrared sensor and the bottom side of the battery module frame.

In a specific example, when applying pressure to the bottom side of the battery module frame using the displacement sensor, it is possible to measure the displacement degree of the bottom side of the battery module frame.

In another embodiment, the apparatus for evaluating durability of a battery module frame according to the present invention further includes a pressure sensor. In a specific example, the pressure sensor may be arranged between the bottom side of the battery module frame and the pressing member and may measure the change in the pressure applied to the bottom side of the target battery module frame during the operation of the pressing unit.

The pressure sensor may be a film-type pressure sensor for sensing applied pressure or force and may be a film-type pressure sensitive resister (PSR) sensor. Further, the PSR sensor may be a sensor for measuring the change in the resistance according to pressure or force applied to the surface of the PSR sensor.

In a specific example, it is possible to easily measure the change in the pressure applied to the bottom side of the battery module frame during the operation of the pressing unit, and it is possible to evaluate the degree of change of the welded portion of the battery module frame, etc.

Further, the apparatus for evaluating durability of a battery module frame according to the present invention may include a storage unit which receive and store the measurement result generated by the measurement of the displacement sensor and/or pressure sensor. The storage unit may store the measurement result from the displacement sensor and/or pressure sensor and build a database based thereon. For example, the values of the pressure applied to the target battery module frame and displacement values of the module frame according thereto may be summarized as a table or a graph. Such measurement data may be used as the basis for predicting the degree of fatigue and lifespan of the battery module frame.

Further, the apparatus for evaluating durability of a battery module frame according to the present invention may include an output unit for monitoring the measurement result generated by the measurement of the displacement sensor and/or pressure sensor. The output unit may be a conventional monitoring device.

Further, the apparatus for evaluating durability of a battery module frame according to the present invention may further include first and second reinforcing plates respectively coupled to a front surface and a rear surface of the battery module frame. The first and second reinforcing plates prevent distortion of the battery module during the evaluation of the durability for the welded portion.

In a specific example, the first and second reinforcing plates are bolt-fastened to the battery module. In one embodiment, one or more bolt-fastening holes are formed on the front surface and the rear surface of the battery module frame, and one or more bolt-fastening holes are formed at one or more positions respectively on the first and second reinforcing plates, which correspond to the one or more bolt-fastening holes formed on the front surface and the rear surface of the battery module frame. Further, the battery module frame is bolt-fastened to the first and second reinforcing plates, respectively. For example, 10 to 30 bolt-fastening holes, which are arranged in a row, are formed on the front surface and the rear surface of the battery module frame. The bolt-fastening holes, which are formed on the front surface and the rear surface of the battery module frame and the first and second reinforcing plates, have a structure in which a female screw thread is independently formed inside.

Further, the present invention provides a method of evaluating durability of a battery module frame using the above-described apparatus for evaluating durability of a battery module frame.

In one embodiment, a method of evaluating durability of a battery module frame according to the present invention includes applying pressure to a bottom side of a battery module frame using a pressing unit which is arranged inside the battery module frame. Further, in the method of evaluating durability of a battery module frame according to the present invention, during the applying of the pressure to the bottom side of the battery module frame, a displacement degree of a welded portion of the battery module frame is evaluated. In this process, when applying pressure to the target battery module frame, it is possible to recognize the rigidity of the battery module frame. Further, it is possible to easily recognize the constant force and/or fatigue properties of the welded portion in the target battery module frame.

Further, when applying pressure to the bottom side of the battery module frame, the pressure may be consecutively or repeatedly applied. The pressure is applied to the bottom side of the battery module frame to provide constraints similar to a situation in which a swelling phenomenon occurs in a battery cell. In a specific example, during the applying of the pressure to the bottom side of the battery module frame, pressure may be applied to be oriented in a direction in which a swelling phenomenon occurs in the battery cell arranged in the battery module frame. Namely, as described above, an object of the present invention is to provide constraints similar to a situation in which a swelling phenomenon occurs in the battery cell by allowing pressure, which is applied to the target battery module frame, to be oriented in a direction in which the swelling phenomenon occurs in the battery cell by using a pressing unit.

In another embodiment, in the method of evaluating durability of a battery module frame according to the present invention, during the applying of the pressure to the bottom side of the battery module frame, a displacement degree of the bottom side of the battery module frame is evaluated. The displacement degree of the bottom side of the battery module frame may be measured using a displacement sensor such as an infrared sensor.

In another embodiment, in the method of evaluating durability of a battery module frame according to the present invention, during the applying of the pressure to the bottom side of the battery module frame, the pressure applied to the bottom side of the battery module frame is measured. In a specific example, it is possible to easily measure the change in the pressure applied to the bottom side of the battery module frame during the operation of the pressing unit, and it is possible to evaluate the degree of change of the welded portion of the battery module frame or the degree of change of the bottom portion in the battery module frame according to the pressure change.

Namely, according to the apparatus and method for evaluating durability of a battery module frame for a vehicle of the present invention, it is possible to easily evaluate the durability of the welded portion of the battery module frame, etc. by providing constraints similar to a situation in which a swelling phenomenon occurs in a battery cell in the battery module frame.

DETAILED DESCRIPTION OF EMBODIMENTS

Hereinafter, the apparatus and method for evaluating durability of a battery module frame according to the present invention will be described in detail.

First Embodiment

FIGS. 1 and 2 are schematic diagrams of an apparatus for evaluating durability of a battery module frame according to one embodiment of the present invention. With reference to FIGS. 1 and 2, an apparatus 100 for evaluating durability of a battery module frame according to the present invention includes: a support 120 which supports a target battery module frame 110 to allow the target battery module frame 110 to be spaced apart from the ground at a predetermined interval; and a pressing unit 130 which is arranged inside the battery module frame 110 and applies pressure to a bottom side of the battery module frame 110.

Specifically, the apparatus 100 for evaluating durability of a battery module frame according to the present invention provides constraints similar to a situation in which a swelling phenomenon occurs in a battery cell inside the battery module frame 110 by applying pressure to the target battery module frame 110. Further, when applying pressure to the battery module frame 110, it is possible to evaluate the durability of the welded portion 111 of the battery module frame 110.

The battery module frame 110 is mounted by a support 120 so as to be spaced apart from the ground at a predetermined interval. Specifically, the support 120 is composed of first and second supports 121 and 122, and the first and second supports 121 and 122 are coupled to both sides of the battery module frame, respectively. Specifically, the first and second supports 121 and 122 may be bolt-fastened (not shown) to both sides of the battery module frame 110. The first and second supports 121 and 122 may be fastened to the front surface and the rear surface of the battery module frame 110, respectively. In particular, as the battery module frame 110 is mounted on the support 120 to be spaced apart from the ground at a predetermined interval, it is possible to provide constraints similar to a situation in which a swelling phenomenon occurs in a battery cell at the time of evaluating durability of the battery module frame 110.

Further, a pressing unit 130, which applies pressure to the bottom side of the battery module frame 110, is included in the battery module frame 110. Specifically, the pressing unit 130 includes: a pressing member 131 which is arranged on the bottom side of the battery module frame 110; and a pressing cylinder 132 which is installed on an upper portion of the pressing member 131 and presses the pressing member 131 in a downward direction to allow pressure to be applied to the bottom side of the battery module frame 110.

Further, the pressing member 131 is arranged on the bottom side of the inside of the battery module frame 110 and corresponds to the battery cell arranged inside the battery module frame 110 in the size and shape. Further, since the pressing member receives pressure from the pressing cylinder 132 and transmits the pressure to the bottom side of the battery module frame 110, the pressing member may be formed of a rigid member.

Further, the pressing unit 130 includes a pressing cylinder 132 which presses the pressing member 131 in a downward direction. The pressing cylinder 132 is used to press the pressing member 131 in a downward direction and allows pressure to be applied to the bottom side of the battery module frame 110. Specifically, the pressing cylinder 132 is a hydraulic cylinder and includes a cylinder tube and a piston rod which vertically reciprocates in the cylinder tube. At this time, the end of the piston rod is positioned at the upper portion of the pressing member 131. Further, the pressing cylinder 132 may lower the piston rod to press the pressing member 131 in a downward direction. Specifically, the pressing cylinder 132 may lower the piston rod by supplying a fluid into a cylinder tube, to thereby press the pressing member 131 in a downward direction. At this time, a fluid may be supplied into a tube by a fluid pump or a hydraulic pump.

Further, in the apparatus 100 for evaluating durability of a battery module frame according to the present invention, the pressing cylinder 132 applies pressure to be oriented in a direction in which a swelling phenomenon occurs in the battery cell. Namely, the present invention may provide constraints similar to a situation in which a swelling phenomenon occurs in the battery cell by allowing pressure, which is applied to the target battery module frame, to be oriented in a direction in which the swelling phenomenon occurs in the battery cell by using a pressing unit.

FIGS. 3 and 4 are schematic diagrams showing a welded portion of a target battery module frame according to one embodiment of the present invention.

With reference to FIGS. 3 and 4, the welded portion 111 of the target battery module frame is shown. The battery module frame 110 has shape of a U frame. However, one plate is welded and coupled to the front surface of the U frame in order to evaluate durability of the battery module frame 110. Further, the U frame has a structure in which the plate in the region, into which the pressing cylinder 132 is inserted, is removed, to apply the pressing cylinder 132.

Further, according to the present invention, when applying pressure to the bottom side of the lower portion of the battery module frame 110 by the pressing unit, it is possible to evaluate the displacement degree of the welded portion 111 of the edge region in the battery module frame 110.

The present invention provides a method of evaluating durability of a battery module frame using an apparatus for evaluating durability of a battery module frame.

Specifically, a method of evaluating durability of a battery module frame according to the present invention includes applying pressure to a bottom side of a battery module frame using a pressing unit which is arranged inside the battery module frame. In particular, in the method of evaluating durability of a battery module frame according to the present invention, during the applying of the pressure to the bottom side of the battery module frame, a displacement degree of a welded portion of the battery module frame is evaluated.

At this time, during the applying of the pressure to the bottom side of the battery module frame, pressure may be applied to be oriented in a direction in which a swelling phenomenon occurs in the battery cell arranged in the battery module frame. This is to provide constraints similar to a situation in which a swelling phenomenon occurs in the battery cell by allowing pressure, which is applied to the target battery module frame, to be oriented in a direction in which the swelling phenomenon occurs in the battery cell by using a pressing unit.

As such, the durability of the welded portion can be easily evaluated within a short period of time through the accelerated test according to the present invention.

Second Embodiment

FIG. 5 is a schematic diagram of an apparatus for evaluating durability of a battery module frame according to another embodiment of the present invention. With reference to FIG. 5, an apparatus 200 for evaluating durability of a battery module frame according to the present invention includes: a support 220 which supports a target battery module frame 210 to allow the target battery module frame 210 to be spaced apart from the ground at a predetermined interval; and a pressing unit 230 which is arranged inside the battery module frame 210 and applies pressure to a bottom side of the battery module frame 210.

At this time, the pressing unit 230 includes: a pressing member 231 which is arranged on the bottom side of the battery module frame 210; and a pressing cylinder 232 which is installed on an upper portion of the pressing member 231 and presses the pressing member 231 in a downward direction to allow pressure to be applied to the bottom side of the battery module frame 210.

Further, the apparatus 200 for evaluating durability of a battery module frame according to the present invention further includes a displacement sensor 240 which measures a displacement degree of the bottom side of the target battery module frame 210. The displacement sensor 240 is a non-contact sensor and may be an infrared sensor for irradiating and receiving infrared rays on the bottom side of the battery module frame 210 to be measured. The infrared sensor is located on the lower portion on the bottom side of the battery module frame 210, and it is possible to measure the displacement degree of the bottom side of the battery module frame 210 by measuring the distance between the infrared sensor and the bottom side of the battery module frame 210.

On the other hand, the description about each element of the apparatus for evaluating durability of a battery module frame according to the present invention has already been made above, and thus a specific description about each element is omitted here.

Further, the present invention provides a method of evaluating durability of a battery module frame using an apparatus for evaluating durability of a battery module frame.

Specifically, a method of evaluating durability of a battery module frame according to the present invention includes applying pressure to a bottom side of a battery module frame using a pressing unit which is arranged inside the battery module frame. In particular, in the method of evaluating durability of a battery module frame according to the present invention, during the applying of the pressure to the bottom side of the battery module frame, a displacement degree of a welded portion of the battery module frame is evaluated.

Further, in the method of evaluating durability of a battery module frame according to the present invention, during the applying of the pressure to the bottom side of the battery module frame, a displacement degree of the bottom side of the battery module frame is measured.

As such, the durability of the welded portion can be easily evaluated within a short period of time through the accelerated test according to the present invention.

Third Embodiment

FIG. 6 is a schematic diagram of an apparatus for evaluating durability of a battery module frame according to yet another embodiment of the present invention. With reference to FIG. 6, an apparatus 300 for evaluating durability of a battery module frame according to the present invention includes: a support 320 which supports a target battery module frame 310 to allow the target battery module frame 310 to be spaced apart from the ground at a predetermined interval; and a pressing unit 330 which is arranged inside the battery module frame 310 and applies pressure to a bottom side of the battery module frame 310.

At this time, the pressing unit 330 includes: a pressing member 331 which is arranged on the bottom side of the battery module frame 310; and a pressing cylinder 332 which is installed on an upper portion of the pressing member 331 and presses the pressing member 331 in a downward direction to allow pressure to be applied to the bottom side of the battery module frame 310.

Further, the apparatus 300 for evaluating durability of a battery module frame according to the present invention includes a pressure sensor 350 between the bottom side of the battery module frame 310 and the pressing member 331. Specifically, the pressure sensor 350 is a film-type pressure sensor and measure the change in the pressure applied to the bottom side of the target battery module frame 310 during the operation of the pressing unit 330. Specifically, the pressure sensor 350 is a film-type pressure sensitive resistor (PSR) sensor and can sense pressure or force, and is a sensor for measuring the changed value of resistance according to the change of pressure or force applied to the surface of the PSR sensor.

According to the apparatus 300 for evaluating durability of a battery module frame of the present invention, it is possible to easily measure the change in the pressure applied to the bottom side of the battery module frame 310 during the operation of the pressing unit 330, and it is possible to evaluate the degree of change of the welded portion of the battery module frame 310 according to the pressure.

On the other hand, the description about each element of the apparatus for evaluating durability of a battery module frame according to the present invention has already been made above, and thus a specific description about each element is omitted here.

Fourth Embodiment

FIGS. 7 and 8 are schematic diagrams of an apparatus for evaluating durability of a battery module frame according to further another embodiment of the present invention. With reference to FIGS. 7 and 8, an apparatus 400 for evaluating durability of a battery module frame according to the present invention includes: a support 420 which supports a target battery module frame 410 to allow the target battery module frame 410 to be spaced apart from the ground at a predetermined interval; and a pressing unit 430 which is arranged inside the battery module frame 410 and applies pressure to a bottom side of the battery module frame 410.

At this time, the pressing unit 430 includes: a pressing member 431 which is arranged on the bottom side of the battery module frame 410; and a pressing cylinder 432 which is installed on an upper portion of the pressing member 431 and presses the pressing member 431 in a downward direction to allow pressure to be applied to the bottom side of the battery module frame 410.

Further, a plurality of bolt-fastening holes 411 and 412, which are arranged in a row, are formed on the front surface and the rear surface of the battery module frame 410, respectively. The first and second reinforcing plates 460 and 470 are arranged on the front surface and the rear surface of the battery module frame 410, and a plurality of bolt-fastening holes 461 and 471 are formed on the first and second reinforcing plates 460 and 470, respectively. The battery module frame 410 is bolt-fastened to the first and second reinforcing plates 460 and 470 by bolts 462 and 472, respectively.

Further, the apparatus 400 for evaluating durability of a battery module frame according to the present invention includes a pressure sensor 450 between the bottom side of the battery module frame 410 and the pressing member 431.

According to the apparatus 400 for evaluating durability of a battery module frame of the present invention, it is possible to easily measure the change in the pressure applied to the bottom side of the battery module frame 410 during the operation of the pressing unit 430, and it is possible to evaluate the degree of change of the welded portion of the battery module frame 410 according to the pressure.

On the other hand, the description about each element of the apparatus for evaluating durability of a battery module frame according to the present invention has already been made above, and thus a specific description about each element is omitted here.

In the above, the present invention has been described in more detail through the drawings and examples. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

DESCRIPTION OF REFERENCE NUMERALS

- 100, 200, 300, 400: apparatus for evaluating durability of a battery module frame
- 110, 210, 310, 410: battery module frame
- 111: welded portion
- 120, 220, 320, 420: support
- 121, 221, 321, 421: first support
- 122, 222, 322, 422: second support
- 130, 230, 330: 430: pressing unit
- 131, 231, 331, 431: pressing member
- 132, 232, 332, 432: pressing cylinder
- 240: displacement sensor
- 350, 450: pressure sensor
- 411, 412, 461, 471: bolt-fastening hole
- 46, 470: reinforcing plate
- 462, 472: bolt

The invention claimed is:

1. An apparatus for evaluating durability of a target battery module frame, the apparatus comprising:
    a first support and a second support extending vertically and spaced apart from each other in a lateral direction, the first and second supports being adapted to hold the target battery module frame in place between the first and second supports and to position the target battery module frame to be spaced apart from a ground, on which the first and second supports sit, at a predetermined interval; and
    a pressing unit shaped to be placed inside the target battery module frame in a downward direction toward the ground and to apply pressure to a bottom side of the target battery module frame,
    wherein the pressing unit includes:
        a pressing member movable between the first and second supports in the downward direction and having a smaller width than a distance between the first and second supports in the lateral direction, the pressing member being shaped to be placed on the bottom side of the target battery module frame inside the target battery module frame; and
        a pressing cylinder installed on an upper portion of the pressing member for pressing the pressing member in the downward direction to apply pressure to the bottom side of the target battery module frame.

2. The apparatus of claim 1, further comprising a displacement sensor positioned below the pressing unit and between the first and second supports, the displacement sensor being configured to measure a displacement degree of the bottom side of the target battery module frame.

3. The apparatus of claim 1, wherein the first and second supports are adapted to couple to two opposing lateral sides of the target battery module frame, respectively.

4. The apparatus of claim 3, wherein the first and second supports are adapted to couple to the two opposing lateral sides of the target battery module frame, respectively, by bolt-fastening.

5. The apparatus of claim 1, wherein a size of the pressing member corresponds to a size of a battery cell that the target battery module frame is adapted to hold.

6. The apparatus of claim 1, further comprising a pressure sensor disposed at a bottom side of pressing member and configured to measure a change in the pressure applied to the bottom side of the target battery module frame.

7. The apparatus of claim 1, wherein the pressing cylinder is a pneumatic or hydraulic cylinder including:
    a cylinder tube; and a piston rod adapted to vertically reciprocate in the cylinder tube.

8. The apparatus of claim 7, wherein;
an end of the piston rod is positioned at the upper portion of the pressing member, and
the pressing cylinder is adapted to lower the piston rod to press the pressing member in the downward direction.

9. The apparatus of claim 1, further comprising first and second reinforcing plates extending laterally between the first and second supports and adapted to couple to a front surface and a rear surface of the target battery module frame, respectively.

10. The apparatus of claim 9,
wherein one or more bolt-fastening holes are formed respectively at one or more positions on the first and second reinforcing plates, and
wherein the first and second reinforcing plates are adapted to couple to the front and rear surfaces of the target battery module frame, respectively, by bolt-fastening.

11. The apparatus of claim 1, wherein the pressing member is shaped to be placed inside the target battery module frame in the downward direction through an opening in an upper portion of the target battery module frame.

12. A method of evaluating durability of a target battery module frame using an apparatus for evaluating durability of the battery module frame, the method comprising:
providing the apparatus including:
a first support and a second support extending vertically and spaced apart from each other in a lateral direction; and
a pressing unit including:
a pressing member movable between the first and second supports in a downward direction and having a smaller width than a distance between the first and second supports in the lateral direction; and
a pressing cylinder installed on an upper portion of the pressing member for pressing the pressing member in the downward direction;
using the first and second supports to hold the target battery module frame in place between the first and second supports and to position the target battery module frame to be spaced apart from a ground, on which the first and second supports sit, at a predetermined interval;
applying pressure to a bottom side of the target battery module frame by placing the pressing member inside the target battery module frame and using the pressing cylinder to press the pressing member in the downward direction on the bottom side of the target battery module inside the target battery module frame; and
during the applying of the pressure to the bottom side of the battery module frame, evaluating a displacement degree of the bottom side of the target battery module frame.

13. The method of claim 12, wherein the applying of the pressure to the bottom side of the target battery module frame includes applying pressure in a direction of a swelling phenomenon in a battery cell the target battery module frame is adapted to hold.

14. The method of claim 12, wherein the applying of the pressure to the bottom side of the target battery module frame includes placing the pressing member inside the target battery module frame in the downward direction through an opening in an upper portion of the target battery module frame.

* * * * *